United States Patent
Levinson

(10) Patent No.: US 10,726,732 B2
(45) Date of Patent: Jul. 28, 2020

(54) SYSTEM AND METHOD OF PRODUCING AND PROVIDING USER SPECIFIC EDUCATIONAL DIGITAL MEDIA MODULES AUGMENTED WITH ELECTRONIC EDUCATIONAL TESTING CONTENT

(71) Applicant: SmartNoter Inc., Fairfax, VA (US)

(72) Inventor: Gene Levinson, Fairfax, VA (US)

(73) Assignee: SmartNoter Inc., Fairfax, VA (US)

( * ) Notice: Subject to any disclaimer, the term of this patent is extended or adjusted under 35 U.S.C. 154(b) by 296 days.

(21) Appl. No.: 15/872,191

(22) Filed: Jan. 16, 2018

(65) Prior Publication Data

US 2019/0221131 A1 Jul. 18, 2019

(51) Int. Cl.
| | |
|---|---|
| A63F 9/24 | (2006.01) |
| G09B 5/12 | (2006.01) |
| G09B 5/06 | (2006.01) |
| G09B 7/08 | (2006.01) |
| G09B 7/07 | (2006.01) |
| H04L 29/06 | (2006.01) |
| H04L 29/08 | (2006.01) |

(52) U.S. Cl.
CPC .............. *G09B 5/12* (2013.01); *G09B 5/065* (2013.01); *G09B 7/07* (2013.01); *G09B 7/08* (2013.01); *H04L 65/4084* (2013.01); *H04L 65/4069* (2013.01); *H04L 67/12* (2013.01)

(58) Field of Classification Search
CPC . H04L 65/4069; H04L 65/4084; H04L 67/12; G09B 7/08; G09B 5/065; G09B 7/07; G09B 5/12
See application file for complete search history.

(56) References Cited

U.S. PATENT DOCUMENTS

| | | |
|---|---|---|
| 7,782,363 B2 | 8/2010 | Ortiz |
| 7,801,910 B2 | 9/2010 | Houh |
| 8,228,372 B2 | 7/2012 | Griffin |
| 8,307,392 B2 | 11/2012 | Ahanger |
| 8,526,782 B2 | 9/2013 | Kaiser |
| 8,917,355 B1 | 12/2014 | Mo |
| 9,031,382 B1 | 5/2015 | Kaiser |
| 9,170,700 B2 | 10/2015 | Kaiser |
| 9,451,180 B2 | 9/2016 | Mo |
| 9,462,309 B2 | 10/2016 | Kaiser |
| 9,716,918 B1* | 7/2017 | Lockton ............... H04N 21/812 |

(Continued)

OTHER PUBLICATIONS

Youtube.com, "How_To_Create_Inteactive_Quizzes_In YouTube", 2013, pp. 1-10, at https://www.youtube.com/watch?v=8f4CIMxb6EQ (last visited Dec. 13, 2019). (Year: 2013).*

(Continued)

*Primary Examiner* — Steve Rowland
(74) *Attorney, Agent, or Firm* — Sheppard Mullin Richter & Hampton LLP

(57) ABSTRACT

A system and method is provided for producing and providing educational digital media modules. The system may facilitate the segmentation and synchronization of multiple digital media components for combination in an educational digital media module. The system may further select digital media components for inclusion within an educational digital media module according to user profiles determined according to user input and interaction with the system.

16 Claims, 3 Drawing Sheets

(56) References Cited

U.S. PATENT DOCUMENTS

| | | | |
|---|---|---|---|
| 2002/0087496 A1 | 7/2002 | Stirpe | |
| 2003/0152904 A1 | 8/2003 | Doty | |
| 2003/0227479 A1 | 12/2003 | Mizrahi | |
| 2005/0154679 A1* | 7/2005 | Bielak | G09B 7/02 705/59 |
| 2007/0160969 A1* | 7/2007 | Barton | G09B 7/00 434/323 |
| 2007/0288969 A1* | 12/2007 | Prum | A63F 13/10 725/81 |
| 2009/0019078 A1 | 1/2009 | Chisholm | |
| 2009/0047648 A1* | 2/2009 | Ferreira | G09B 7/08 434/323 |
| 2009/0262135 A1* | 10/2009 | Huston | H04N 5/44504 345/629 |
| 2010/0154007 A1 | 6/2010 | Touboul | |
| 2010/0293190 A1 | 11/2010 | Kaiser | |
| 2011/0173576 A1* | 7/2011 | Murphy | G06F 3/0481 715/863 |
| 2013/0004935 A1 | 1/2013 | Smith | |
| 2013/0090986 A1* | 4/2013 | Casinelli | G06Q 30/0217 705/7.32 |
| 2015/0081611 A1 | 3/2015 | Shivakumar | |
| 2015/0165322 A1* | 6/2015 | Gault | A63F 13/10 463/31 |
| 2015/0302057 A1 | 10/2015 | Kealey | |
| 2016/0133148 A1* | 5/2016 | Hanks | G09B 7/06 434/309 |
| 2016/0253912 A1 | 9/2016 | Heilman | |
| 2016/0335905 A1 | 11/2016 | Barber | |
| 2017/0213469 A1 | 7/2017 | Elchik | |
| 2017/0358321 A1* | 12/2017 | Kilar | G11B 27/002 |
| 2018/0232352 A1 | 8/2018 | Fulford | |
| 2019/0221131 A1* | 7/2019 | Levinson | G09B 5/065 |

OTHER PUBLICATIONS

"Comparing and Synchronizing Two Videos", www.kinovea.org, 2 pages.

"Sony Vegas—How to Place Two Videos Side by Side / Split Screen", Sony Vegas Movie Studio, you-tube clip located at: https://www.youtube.com/watch?v=hNgeuB-32e4, 1 page.

"Sony Vegas 8 Tip 4: Videos Side by Side", Sony Vegas Movie Studio, you-tube clip located at: https://www.youtube.com/watch?v=dR0cjwkbjhk, 1 page.

"Vinja—Video that Clicks", www.vinjavideo.com, 58 pages.

* cited by examiner

SYSTEM AND METHOD OF PRODUCING AND PROVIDING USER SPECIFIC EDUCATIONAL DIGITAL MEDIA MODULES AUGMENTED WITH ELECTRONIC EDUCATIONAL TESTING CONTENT

FIELD OF THE INVENTION

The invention relates to a system and method of producing and providing customized user-specific educational digital media modules.

BACKGROUND OF THE INVENTION

Digital education is fast growing, as students take advantage of the ability to take courses on-line. On-line courses of all types may be presented through digital media content, e.g., videos and/or audio recordings. Students may receive digital media files, via download and/or streaming, including either audio or video content, or both. Educational digital media files may be partitioned into segments of varying length. Start and stop points of segments may be selected, for example, to break up topic material and permit a user to navigate the digital media file with greater ease.

Although digital education may provide flexibility as to the time and place at which students view or listen to coursework, there are other aspects of digital education that lack flexibility. Educational digital media content is static, providing each student with the same content, regardless of the student's aptitude or learning style. Students who have trouble grasping a particular concept may seek out additional materials and/or simply replay a digital media file segment. Students who excel in a particular concept and would benefit from enrichment, similarly, must seek out additional content to meet that need. These are but a few drawbacks of digital education as compared to traditional classroom settings, which permit an educator to meet the varying needs of individual students. These drawbacks may limit the power of digital education.

These and other drawbacks exist with conventional digital education.

SUMMARY OF THE INVENTION

The invention addressing these and other drawbacks relates to a system and method of producing and providing customized user specific digital education content. More specifically, the system facilitates the custom creation of multiple complementary digital media files to accompany core educational digital media content, according to the determined needs and preferences of a specific student. The system may access a user profile, generated via machine learning analysis of a user's interaction with the system, to build customized complementary digital media files for presentation simultaneous to a core educational digital media file. The system may further facilitate the production of complementary digital media files and the generation of a customization ruleset for use in customizing the complementary digital media files according to a user's profile. A user engaged in an on-line or other digital learning experience may select core educational digital media content for viewing, while the system may, according to the information stored in a user profile, select additional complementary digital media files for simultaneous presentation to the user. The core digital media file and complementary digital media files may, together, comprise an educational digital media module. Accordingly, a user accessing a digital learning experience may have their experience customized or tailored to their specific preferences and educational requirements. Digital media files of an educational digital media module may include video files, audio files, audiovisual files, image files, slideshow files, and any other format of digital media content.

A user or student may select to view or listen to a core digital media file. The core digital media file may, for example, be one from among a series of digital media files in an educational course series. The core digital media file may include the basic educational material, for example, a professor's lecture or other educational video. The system may then select complementary digital media files appropriate for the user to accompany the core digital media file in an educational digital media module. An educational digital media module may include the core digital media file and multiple additional complementary digital media files, as well as supplemental components containing links to additional materials. An educational digital media module may, as a non-limiting example, include a core digital media file and two complementary digital media files.

Systems and methods described herein facilitate the production and delivery of educational digital media modules. Each digital media file within an educational digital media module may include multiple segments. Multiple segments, each defined by a start point and an end point, may be arranged linearly to form a digital media file. The segments of each digital media file within a digital media module may be synchronized. For example, the start and stop points a core file's segments coincide temporally with the start and stop points of a complementary file's segments. The segments of each digital media file may be selected to be complementary to the corresponding segments of the other digital media files within the module, such that one digital media file provides additional information that enhances the content of the other digital media files within the module. Additionally, each digital media file may include a supplementary component selected to provide links to additional in-depth detailed content. The segments of each digital media file may be customizable, wherein the segments are selected according to a user profile constructed via machine learning techniques. Accordingly, the system may provide tools for constructing and displaying a customizable digital media experience for a user, wherein multiple complementary audio and/or video components are provided, along with additional supplemental content.

In an implementation, a computer implemented method of providing an educational digital media module is provided. The method may be implemented in a computer system having one or more physical processors programmed with computer program instructions that, when executed by the one or more physical processors, cause the computer system to perform the method. The method may include obtaining, by the computer system, a plurality of core media files including at least a first core media file and a second core media file and a plurality of complementary media file segments; obtaining, by the computer system, a customization rule set defining associations between the first and second core media files and the plurality of complementary media file segments; receiving, by the computer system, a first core media file from a user of the first core media file or the second core media file; obtaining, by the computer system, a user profile of the user defining user characteristics; selecting, by the computer system, a primary complementary media file and a secondary complementary media file from the plurality of complementary media file segments according to the first core media file, the customization rule set, and the user profile, generating, by the computer system, an educational digital media module including the first core media file, the primary complementary media file segment, and the secondary complementary media file segment; and transmitting, by the computer system, the educational digital media module to a user device having a display to cause the user device to playback the first core media file, the primary complementary media file, and the secondary complementary media file simultaneously.

In another implementation, a system of providing an educational digital media module may be provided. The system may include a computer system having one or more physical processors programmed by computer program instructions. The compute program instructions may cause the computer system to obtain a plurality of core media files including at least a first core media file and a second core media file and a plurality of complementary media file segments; obtain a customization rule set defining associations between the first and second core media files and the plurality of complementary media file segments; receive a first core media file from a user of the first core media file or the second core media file; obtain a user profile of the user defining user characteristics; select a primary complementary media file and a secondary complementary media file from the plurality of complementary media file segments according to the first core media file, the customization rule set, and the user profile; and generate an educational digital media module including the first core media file, the primary complementary media file segment, and the secondary complementary media file segment, and the educational digital media module to a user device having a display to cause the user device to playback the first core media file, the primary complementary media file, and the secondary complementary media file simultaneously.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method of producing and providing customized user specific educational digital media content. The system may facilitate both the production and display of customized educational digital media modules including multiple digital media files. As described in greater detail herein, the systems and methods described herein may further be used for producing and providing customized user specific digital media content in many contexts, including entertainment, video gaming, journalism, sports coaching, advertising, and other areas.

The invention described herein includes the production and playback of digital media files. Digital media files may include computer files for storing information of any type of digital media, including at least photos, slide shows, audio content, audiovisual content, and/or video content. Digital media files may thus include images, audiovisual files, audio only files, slide show presentations, animated images, video only files, and others, without limitation.

Figure 1:
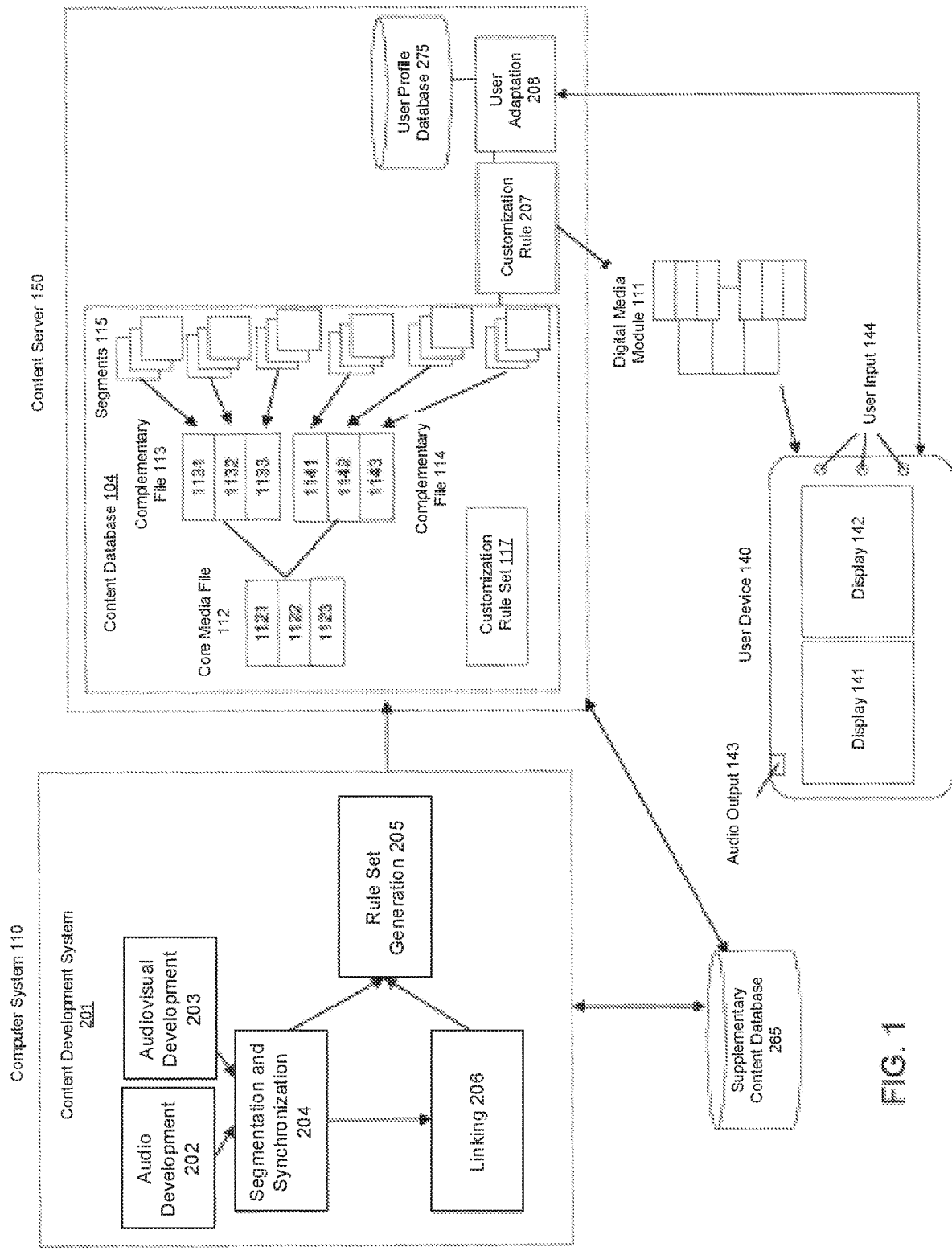
FIG. 1 illustrates a system for production and display of educational digital media modules, according to an implementation of the invention.

FIG. 1 illustrates a system for producing and providing customized digital media modules, according to an implementation of the invention.

The system 100 may include at least a computer system 110, a user device 140, and an educational content server 150, in communication with one another via a network. Computer system 110 may be configured with software tools, e.g., content development system 210, to facilitate the production of digital media files that may be customizably packaged together into educational digital media modules. Educational content server 150 may be configured to store educational digital media files in a content database 104, to customize educational digital media modules according to user profiles, and to provide these to user device 140 at appropriate times. Educational content server 150 may further be configured to generate, revise, and update user profiles according to user interaction information. User device 140 may include one or more displays 141/142 and may be configured for playback of educational digital media modules. User device 140 may further include one or more interaction devices 144. Interaction devices 144 may include, for example, computer mice, touchscreens, keyboards, trackpads, trackballs, and/or any other suitable computer input devices configured to accept user interaction.

Computer system 110 may be configured to facilitate the generation of educational digital media files that can be packaged together by content server 150 as digital media modules 111 for playback and/or presentation by user device 140. Educational digital media modules 111 may include multiple digital media files (e.g., audio, video, and/or interactive components) and multiple supplementary components. Audio components may include stand-alone digital media files as well as audio content associated with a video. Video components may include animation components, filmed video, slideshows, and any other type of non-static visual content. Interactive components may include tests, polls, quizzes, and/or other digital media components that permit user interaction. Each file of educational digital media module 111 may include multiple digital media segments and multiple supplementary components associated with the digital media segments. Supplementary components may include links to additional content, such as links to web-pages, links that launch separate applications, links that cause the display of additional information, links that cause the display of video or audio media, and any other type of link that, when engaged, initiates the display of additional information. Supplementary components may be associated with digital media files, either core media files 112 and/or complementary media files 113, 114.

User device 140 may be employed by a user to view educational digital media module 111 on the one or more display screens 141/142. An educational digital media module 111 having multiple video components may use one or more screens for display. In some implementations, multiple screens may be used, each displaying a video component. In some implementations, a single screen may be partitioned to display multiple video components in different portions. User device 140 may receive user input via one or more interaction devices 144. User input may be employed to interact with educational digital media module 111. In some implementations, user input may be communicated to educational content server 150.

Educational content server 150 may provide content, e.g., educational digital media modules 111, to user device 140. Educational digital media modules 111 may be provided to user device 140 as full downloadable files, as streams for concurrent playing and downloading, and/or in any combination of these. Educational content server 150 may also be configured to customize educational digital media modules 111 for specific user according to stored user profiles.

The system may include a customization tool 207 configured to generate a customized digital media module 111 according to a user's specific needs and preferences, e.g., as stored in a user profile. Digital media module 111 may be transmitted to user device 140 for playback. Customization tool 207 may generate educational digital media module 111 including a core media file 112 and at least one complementary media file 113, 114. The core media file may include multiple segments 1121, 1122, 1123. Complementary media file 113 may include multiple segments 1131, 1132, and 1133 corresponding to the multiple segments 1121, 1122, 1123 of the core media file 112. Complementary media file 114 may also include multiple segments 1141, 1142, and 1143 corresponding to the multiple segments 1121, 1122, 1123 of the core media file 112. Corresponding segments of core media file 112 and complementary media files 113, 114 may be synchronized such that, during playback, corresponding segments begin and end at the same point. Accordingly, digital media module 111 may include multiple media files, each consisting of multiple segments synchronized to the segments of the other media files in the module. During playback, one or more of the multiple media files may be played simultaneously.

Customization tool 207 may select the multiple segments 1131, 1132, 1133, and 1141, 1142, 1143 of complementary media files 113 and 114 from multiple alternative segments 115 according to a comparison between a user profile and customization rule set. Each segment 1121, 1122, 1123 of core media file 112 may have multiple associated alternative segments 115 available. The associated alternative segments 115 may each include content that is complementary to the content of the segments of core media file 112. During media module 111 generation, customization tool 207 may select multiple segments 115 as complementary segments to each segment of core media file 112. The selected complementary segments may be used to build the complementary media files 113 and 114.

For example, a course of study may include a series of core media files 112, e.g., lectures, each corresponding to a lesson. The core media files 112 may be, for example, recordings of a professor's lectures over the course of a semester and/or recordings of lectures produced specifically to serve as core media files 112 of educational digital media module 111. The user may select the lesson, e.g., the specific core media file 112, that they wish to consume. In some implementations, customization tool 207 may select the core media file 112 for the user according to a user progress metric stored in the user profile.

Customization tool 207 may then select, according to the user profile and the customization rule set, appropriate complementary digital media segments 115 corresponding to the segments of the selected core media file 112 for the user. Selected digital media segments 115 associated with the core media file 112 segments may be varied by customization tool 207 according to a user's preferences, a user's learning level, a user's learning style, a user's learning preferences, and/or other specific user information in comparison with a customization rule set 117 associated with core media file 112 and complementary media files 113, 114. Thus, the system may provide an educational digital media module 111 specifically tailored to a user according to the user's profile. Selected complementary digital media file segments may include digital media presentations that provide additional information about a topic or concept presented in the corresponding core media file segment. Additional information may be presented, for example, in the form of text corresponding to the core media file segment, diagrams or other illustrations corresponding to the core media file segment, video corresponding to the core media file segment, photos or slide shows corresponding to the core media file segment, and/or any other additional information. Selected complementary digital media files may include quizzes, tests, and/or other evaluation tools to determine a user's mastery over the presented material.

Customization tool 207 may further select supplementary components from supplemental content database 265 corresponding to the selected files of digital media module 111 according to the user profile. Supplementary components may be custom selected according to the user profile, including aspects such as user preferences, user learning styles, user progress, and user proficiency.

In some implementations, customization tool 207 may be configured to select components of educational digital media module 111 to match a user's learning level or progress. For example, a user may select an educational course. Customization tool 207 may select segment components of educational digital media module 111 according to a user's progress through the course. If the user has successfully completed earlier lessons in the course, a core media file 112 corresponding to a next lesson may be selected with appropriate primary and secondary digital media components. Where a user has not successfully completed a lesson, for example, the user has failed a quiz or test to demonstrate progress, customization tool 207 may select a core media file 112 to be played again for the user. In some implementations, a user progress metric or indicator stored in a user profile may be compared to criteria of a customization rule set 117 to determine the selection of a core media file 112. For example, a user who has shown exceptional progress may be provided with a core media file 112 including more advanced material, while a user who has shown slower progress may be provided with a core media file 112 including more remedial material. The user's progress may be compared to criteria of the customization rule set 117 to make such a determination.

In some implementations, customization tool 207 may be configured to select complementary digital media files 113, 114 from segments 115 according to a user's learning style. Customization tool 207 may access a user profile to determine a user learning style or preference. Complementary digital media files 113, 114 may be selected to provide additional information in a style and/or format suited to a user learning style. For example, the complementary digital media files 113, 114 may include text, diagrams, equations, and/or other components as indicated by a user learning style stored in a user profile. Information in a user profile may be compared to customization rule set 117 to make such a determination.

In some implementations, customization tool 207 may be configured to select complementary digital media files 113, 114 from segments 115 according to a user's proficiency. Customization tool 207 may select media file segments based on a user's demonstrated proficiency with the material. That is, a user who has demonstrated significant mastery over material, for example through high scores on tests, may receive complementary digital media files 113, 114 and/or supplementary components calibrated to the student's high skill level. A user of higher proficiency may receive media files that explain concepts in greater depth and/or at a higher level of abstraction. Thus, even though two users may be studying the same lesson, materials provided to the users may differ according to the users' demonstrated abilities. Information in a user profile may be compared to customization rule set 117 to make such a determination.

As shown in FIG. 1, customization tool 207 may be implemented as a software tool in operation on content server 150. In some implementations, customization tool 207 may be implemented as a software tool in operation on user device 140 and/or computer system 110. Customization tool 207 may access content database 104 to generate digital media modules 111 according to a user profile and a customization rule set 117 regardless of the location of these aspects.

User adaptation tool 208 may generate a user profile, storable in a user profile database 275, associated with an end user, and accessible by customization tool 207 based on user interactions with the system and with educational digital media modules 111. The user profile may be used by customization tool 207 to select digital media files to be provided to user device 140.

In some implementations, user adaption tool 208 may be configured to build a user profile according to user preferences and other information exposed via user interactions with educational digital media module 111 or other aspects of the system. For example, a user with no history may be provided a core digital media file and an associated complementary digital media file consisting primarily of text based content. The user, preferring diagrammatic content, may interact with the educational digital media module 111 to select an alternative complementary media file based on diagrams to be provided. User adaptation operation 208 may build a user profile based on the user's interaction and, in the future, provide a complementary digital media file including diagrammatic content according to the user profile.

In another example, user adaptation tool 208 may be configured to build and/or update a user profile according to user preferences, proficiency, and/or ability. For example, input received from an advanced student may indicate that the user prefers more challenging content, e.g., the user may frequently request to view, interact with, or playback segments that are more challenging. In another example, the user may skip through or spend less time viewing less challenging content. In another example, the user may request more challenging problems or select more challenging extra credit assignments. Alternatively, the user adaptation tool 208 may adjust and/or update a user profile according to feedback received from a third party, such as a teacher that provides input to the system to be added to that user's profile. In some implementations, user adaptation tool 208 may adjust a user profile according to a user's high scores that may indicate that the user would benefit from those additional challenges, In another example, user adaptation tool 208 may be configured to build and/or update a user profile to accommodate a less advanced student or student requiring remediation. Such a student's input to the user device may indicate that the student would benefit from routinely viewing complementary segments that provide prerequisites to the content, or would benefit from viewing additional segments with step-by-step explanations of problem solutions. User adaptation tool 208 may use active input from the student, analysis of errors that the student makes, and/or teacher input about the specific student's educational requirements.

In still another example, user adaptation tool 208 may be configured to update a user profile to accommodate a student who is learning English as a second language. Such a student may have a user profile indicating that the student should be provided with bilingual materials (i.e. one window with material in English, and another window with material in a second language), and/or complementary audio narrative in the second language.

In some implementations, user adaptation tool 208 may utilize machine learning processes to construct a user profile according to recorded user interactions. User adaptation tool 208 may also use direct user profile inputs, such as selected preferences, demographic information, and other profile parameters received directly from the user to build a profile. User adaptation tool 208 may use any interaction with the system to build a user profile. Such interactions may include explicit questions about preferences and settings. Such interactions may include user selections of various materials, rate of following up with supplemental content, scores on quizzes and tests, and other user actions. Such interactions may further include measurements of time to mastery and/or time spent reviewing material. For example, a user may indicate a preference for text based complementary materials. User adaptation tool 208, however, may determine that the user completes lessons and masters materials faster or more completely when diagram based complementary media files are presented. User adaptation tool 208 may therefore construct the user profile according to user performance, rather than stated user preference.

As shown in FIG. 1, user adaptation tool 208 may be implemented as a software tool in operation on content server 150. In some implementations, user adaptation tool 208 may be implemented as a software tool in operation on user device 140 and/or computer system 110. User adaptation tool 208 may access user profile database 275 to develop, update, and revise a user regardless of the location of these aspects.

Educational content server 150 may be a server configured to receive user connections and transfer data. Educational content server 150 may be a web-server, may be cloud-based, may be single piece of computer hardware, may include multiple pieces of computer hardware, and/or may be configured in any other suitable fashion. Content server 150 may store and serve the digital media files of educational digital media module 111 as well as supplemental content from supplemental content database 265 and/or links to supplemental content stored in supplemental content database 265. Educational content server 150 may store and/or serve the educational digital media module as a single coordinated digital media stream and/or multiple digital media streams. As a single digital media stream, all files of digital media module 111 may be combined into a single digital media file, which, when played, may playback digital media content from core media file 112 and complementary media files 113, 114. As a single digital media stream, the educational digital media module 112 may be viewed by any suitable digital media player. In other implementations, the educational digital media module 112 may be stored and/or served as separate digital media files to be concurrently played in separate windows by specialized digital media software on user device 140.

A user, such as an administrator or other operator other than a student, may operate content development system 201 to prepare digital media files for packaging and association as educational digital media modules 111. The content development system 201 may further be used to generate customization rule set 117, containing rules and criteria for creating digital media modules 111 from the digital media files. The content development system 201 may provide the user with a graphical user interface designed to facilitate the production of educational digital media modules. Content development system 201 may provide tools to the user to develop segments of core and complementary media files. In some implementations, content development system 201 may be a software system in operation on computer system 110.

Content development system 201 may include an audio development tool 202 configured to facilitate obtaining, producing, and editing of an audio media files to accompany a educational digital media module 111. Audio development operation 202 may provide the user with the option to create and/or edit audio components for educational digital media module 111. For example, the user may wish to create a complementary digital media file including audio narration for providing additional information or detail to the information provided by a core media file 112. In some implementations, audio development tool 202 may be used to create or edit an audio media file to provide additional information to a core media file 112. In some implementations, audio development tool 202 may be used to create or edit an audio media file to serve as core media file 112. In some implementations, audio development operation 202 may develop audio components as segments, e.g., discrete lengths of audio information.

Content development system 201 may include an audiovisual development tool 203.

Audiovisual development tool 203 may be employed by the user to generate audiovisual media content for use in audiovisual media files of educational digital media module 111, as core or complementary media files. Audiovisual development tool 203 may permit the user to select and edit existing digital media files and to generate new digital media files.

For example, the user may wish to generate specific graphics to accompany a segment of a core media file or other digital media file. Rather than selecting a preexisting video segment for pairing with the portion of the narrative or digital media component, the user may employ audiovisual development tool 203 to generate a video segment for pairing.

Audiovisual development tool 203 may provide a user with graphics creation tools for developing digital media file segments. Graphics creation tools may provide a user with the ability to generate animated text, motion graphics, and other graphical effects. Graphics creation tools may include prepared graphics creation scripts, interfaces with third party graphics creation software, and any other suitable tools for providing a user with the ability to generate graphics.

Content development system 201 may facilitate the creation and linking of digital file segments 115 through the use of segmentation and synchronization tool 204.

Segmentation and synchronization tool 204 may select begin and end points of one or more digital media files. A user may designate a segment of a first digital media component, for example, by selecting a portion of a core digital media file 112. Segmentation and synchronization tool 204 may then permit the user to select segments of other digital media files having a length corresponding to the designated segment.

Segmentation and synchronization tool 204 may facilitate the synchronization of multiple digital media file segments by a user. Based on an initially selected media file segment, e.g., a core media file segment, segmentation and synchronization tool 204 may associate multiple file segments 115 with the core segment. The user may select start and stop points of multiple digital media file segments in a core media file 112, and selected corresponding start and stop points in additional digital media files. Segmentation and synchronization tool 204 may then associate complementary media file segments 115 with core media file segments 1121, 1122, 1123. For each core media file segment 1121, 1122, 1123, multiple complementary media file segments 115 may be associated. Associating a core media file segment 1121, 1122, 1123, with selected complementary media file segments 115 may be accomplished in any suitable manner, for example, by including metadata information detailing the association, by generating a master file including all association information, and, in some implementations, by storing the associations in a customization rule set 117.

Rule set generation tool 205 may generate a customization rule set 117. Customization rule set 117 may include information about the digital media file segments with which it is associated, including, for example, association segment information, segment selection criteria for determining which complementary segments 115 to select for a user, and others. Association segment information may identify the associations between core media file segments 1121, 1122, 1123 and complementary media file segments 115. Segment selection criteria may include information about the segment for determining whether a segment is appropriate for a user, for example, information about how the segment may conform to user preferences, user proficiency, user learning style, and/or any other information storable in a user profile.

In some implementations, a user may designate multiple complementary digital media file segments 115 to associate with a single core media file segment 1121, 1122, 1123. Thus, each core media file segment 1121, 1122, 1123, may be associated with one or more alternative complementary media file segments 115. In some implementations, associated complementary media file segments 115 may be designated as primary and secondary media file segments, indicating whether they are to be played back on a primary or a secondary display by a user device. In some implementations, complementary media file segments 115 may be associated with other complementary media file segments 115, indicating that they should be paired for simultaneous playback during complementary media file creation.

In an exemplary embodiment, a user may begin with a core media file 112, e.g., an educational video, such as a nature video. The user may select segments of the core media file 112 to be paired to complementary media file segments 115. For example, in a scene showing an alligator, the user may select a complementary digital media segment including informative facts about alligators. The user may select begin and end points of the alligator scene and use the selected time window to crop the length of the selected complementary digital media segment for pairing. The user may continue on to select additional digital media segments to pair to all portions of the core digital media file. Thus, when a viewer watches the product, they may view the original nature video along with a secondary screen providing additional information and facts about the animals and events that are occurring in the primary digital media component.

In an exemplary embodiment, a user may begin with a core media file 112, e.g., an educational lecture. The user may select portions of the core media file 112 to be paired to complementary digital media segments 115. For example, where a core media file is a mathematics lecture, the primary and secondary digital media file segments may provide graphical illustrations of the concepts, ideas, and problems being discussed in the lecture. The user may segment the core media file into multiple segments, and pair each core media file segment with digital media content to serve as the complementary media file segments.

Linking tool 206 may be configured to link supplemental components to digital media segments. Supplemental components may include links to additional information, links to web resources, links to launch applications, and other links to supply additional content. Supplemental components may be associated with the digital media files and file segments and may be activated via user interaction, e.g., clicking on a digital media segment during a display of a concept may launch supplemental content associated with the concept. In some implementations, a core media file may include one or more graphic user interface interaction elements, providing the user with a graphical icon to interact with to engage supplemental content of the core media file.

Additional information linked to by supplemental components of educational digital media module 111 may include data stored in supplemental content database 265 into educational digital media module 111. Supplemental content database 265 may store supplementary data and information, including text based data, video based data, audio based data, image based data, and others. Supplemental components may include links or associations to data stored in supplemental content database 265. Links or associations may be accessed by a user by using a mouse or other input device to select or click on an audiovisual digital media file segment, a specific portion of an audiovisual presentation, a link provided in or near presentation of a digital media file, or any other suitable access method that may be provided with multi-display digital media presentation. In some implementations, an audio-only file may be provided with a graphical icon to represent supplemental content. For example, while viewing a digital media module 111, the user may select a display playing back a complementary digital media file segment when a topic of interest is being presented. Such selection may cause the system to access content linked to in supplemental content database 265. Such content may be displayed in an additional window, in place of a complementary file segment, and/or in various other manners discussed in greater detail below.

Content development subsystem 201 may be used to upload or otherwise transfer the core media file 112, complementary media file segments 115, and customization rule set 117 to content database 104, where it may be accessed by content server 150 for serving to a user device 140.

Educational content server 150 may be configured to transmit the educational digital media module to a user device 140. User device 140 may include one or more displays 141/142, an audio output 143, and one or more user input devices 144. User device 140 may communicate with educational content server 150 to obtain an educational digital media module 111. User device 140 may receive the educational digital media module 111 via download and/or via streaming. A user may view the educational digital media module 111 via the one or more displays 141/142. Displays 141/142 may be divided portions or windows of a single continuous screen and/or may include multiple screens. In some implementations, the two digital media files may each be presented on a separate display, e.g., a complementary digital media file may be presented on display 141 and a second complementary digital media file may be presented on display 142.

User device 140 may be configured to play back the educational digital media module 111, and to permit a user to interact with the educational digital media module 111. User device 140 may be configured to play back the educational digital media module 111 through any suitable digital media viewing software, audio software, and/or may be configured to display the digital media presentation via additional specialized software tools operating on user device 140.

User device 140 may include one or more interaction devices 144. Interaction devices 144 may include, for example, computer mice, touchscreens, keyboards, trackpads, trackballs, and any other suitable computer input device. A user may employ an interaction device 144 to interact with the educational digital media module. The user may, for example, click or otherwise select aspects of digital media files being display on displays 141, 142 during playback of the educational digital media module 111 to access supplemental content. In some implementations, user interactivity may be employed to permit the user to select from among a plurality of complementary digital media file segments 115 associated with the educational digital media module 111. In some implementations, user interactivity may be employed to permit the user to respond to questions, for example, in an educational digital media presentation.

The digital content creation and customization systems of FIG. 1 are described with reference to the generation and customization of educational content for exemplary purposes. The invention is not limited to educational content, however. Systems and methods described herein may be used to generate and customize digital content in a variety of contexts, including sports coaching, journalism, video gaming, entertainment, advertising, and other fields.

For example, in a sports coaching context, a core media file 112 may be a video of an athlete executing an athletic technique. Complementary files 113 and 114 may be selected according to a user's athletic ability and may provide additional information appropriate to the user. A user with basic athletic skills may receive complementary information describing the basics of the athletic technique, while more advanced users may receive customized complementary information describing and/or illustrating more nuanced aspects of the technique.

In a journalism context, core media file 112 may include video of a newsworthy event and/or a news story. Complementary files 113 and 114 may be provided according to a user's preference to explain further details of the event. For example, some users may prefer customized content providing more in-depth details of the event itself, some users may prefer customized content providing more detail regarding the political ramifications of the event, while other user may prefer customized content providing additional detail regarding the international impact of the event.

In further examples, customized video game reviews and/or tutorials may be provided, customized advertisements may be provided, and any other form of customized digital media presentation may be provided.

Accordingly, a person of skill in the art will recognize that the systems and methods discussed herein apply to the creation, generation, and/or customization of any type of digital media content, and are not limited to any of the specific examples presented herein.

Figure 2:
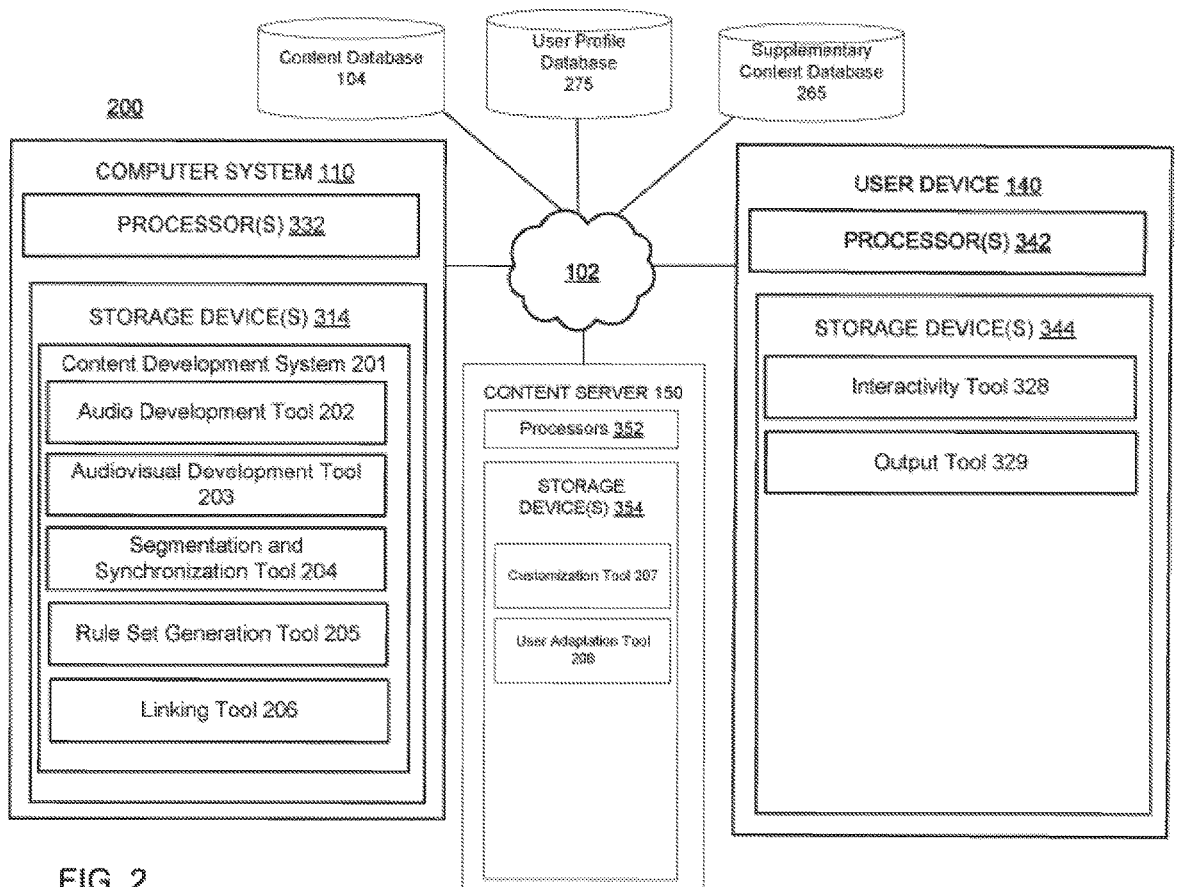
FIG. 2 depicts a system for production and display of educational digital media modules, according to an implementation of the invention.

FIG. 2 depicts a system for production and display of educational digital media modules, according to an implementation of the invention. System 200, as illustrated in FIG. 2, may include at least a computer system 110, a content server 150, and a user device 140, as well as one or more data sources, including content database 104, user profile database 275, and supplemental content database 265. Each of these systems and data sources may be connected to each other via network 102.

Computer system 110 may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to facilitate the production, recording, and editing of digital media content.

Computer system 110 may include one or more processors 332 (also interchangeably referred to herein as processors 332, processor(s) 332, or processor 332 for convenience), one or more storage devices 314, and/or other components. Processors 332 may be programmed by one or more computer program instructions. For example, processors 332 may be programmed by content development system 201, which may include audio development tool 202, visual development tool 203, segmentation and synchronization tool 204, linking tool 206, rule set generation tool 205, and/or other instructions that program computer system 110 to perform various operations, each of which are described in greater detail herein. As used herein, for convenience, the various instructions will be described as performing an operation, when, in fact, the various instructions program the processors 332 (and therefore computer system 110) to perform the operation.

User device 140 may be configured as a server device, a gaming console, a handheld gaming device, a personal computer (e.g., a desktop computer, a laptop computer, etc.), a smartphone, a tablet computing device, and/or other device that can be programmed to receive and output digital media content.

User device 140 may include one or more processors 342 (also interchangeably referred to herein as processors 342, processor(s) 342, or processor 342 for convenience), one or more storage devices 344, and/or other components. Processors 342 may be programmed by one or more computer program instructions. For example, processors 342 may be programmed by interactivity tool 328, output tool 329, and/or other instructions that program user device 140 to perform various operations, each of which are described in greater detail herein. As used herein, for convenience, the various instructions will be described as performing an operation, when, in fact, the various instructions program the processors 342 (and therefore user device 140) to perform the operation.

Educational content server 150 may be configured as a server device, a gaming console, a handheld gaming device, a personal computer (e.g., a desktop computer, a laptop computer, etc.), a smartphone, a tablet computing device, and/or other device that can be programmed to store and transmit digital media content. In some implementations, educational content server 150 may be a cloud-computing platform.

Educational content server 150 may include one or more processors 352 (also interchangeably referred to herein as processors 352, processor(s) 352, or processor 352 for convenience), one or more storage devices 354, and/or other components. Processors 352 may be programmed by one or more computer program instructions. For example, processors 352 may be programmed by user adaptation tool 208, customization tool 207, and/or other instructions that program educational content server 150 to perform various operations, each of which are described in greater detail herein. As used herein, for convenience, the various instructions will be described as performing an operation, when, in fact, the various instructions program the processors 352 (and therefore educational content server 150) to perform the operation.

The arrangement of computer systems and databases illustrated in FIG. 2 and described below is exemplary only. Each of the software tools and databases discussed may be implemented by any of the three computer systems, as well as by additional systems. Implementations of system 200 may include a computer system 110, an educational content server 150, and a user device 140, and/or any combination of the above systems executing any combination of the described software tools. In some implementations, software tools may be executed by more than one system.

Content development system 201 may be a software tool in operation on computer system 110. Content development system 201 may facilitate the production of educational digital media modules via several subsystems permitting the user to manipulate and construct educational digital media modules. Content development system 201 may include an audio development tool 202, a segmentation and synchronization tool 204, a visual development tool 203, linking tool 206, and any additional tools.

Audio development tool 202 may be configured to facilitate the generation and editing of audio data. A user may employ audio development tool 202 to record and/or edit audio data to be incorporated into an educational digital media module 111. Audio development tool 202 may provide the user with common tools for audio recording and editing. Audio development tool 202 may be employed to generate and edit audio information for inclusion within a primary digital media component, a secondary digital media component, and/or an educational digital media module narrative.

Audiovisual development tool 203 may be configured to facilitate the generation and editing of visual data. A user may employ audiovisual development tool 203 to generate and/or edit audiovisual data to be incorporated into educational digital media module 111. In some implementations, audiovisual data may include video recordings, and visual development tool 203 may include common software tools for editing video recordings. In some implementations, audiovisual development tool 203 may include tools, such as scripts or other software tools, for generating animations, including animated texts, animated diagrams, and others. Audiovisual development tool 203 may be employed to generate visual information for inclusion within a primary digital media component and a secondary digital media component.

In some implementations, audiovisual development tool 203 may be configured to generate stereoscopic digital media files. Stereoscopic images provide to viewers the perception of viewing three dimensional images by showing offset versions of an image to the left and right eyes of a viewer. The images shown to each eye are rendered to mimic the different views captured by the left and right eyes of the viewer to provide the user the perception of viewing a three dimensional image. Stereoscopic videos may be achieved in the same fashion. As discussed above, visual development module may be configured to generate a primary and secondary digital media component for simultaneous, synchronized, side-by-side viewing. In some implementations, the primary and secondary digital media component may be left and right eye videos, respectively. When viewed through a suitable viewer, e.g., a stereoscopic 3-D headset, the user may view a 3-D digital media component. The 3-D digital media component segments may be associated with core media file segments and supplemental content, as described above, to provide a 3-D educational digital media module.

In some implementations, audiovisual development tool 203 may generate a second digital media file configured for superposition on a first digital media file. A first digital media file may consist of a camera captured video, while a corresponding second digital media file may include super positioned images providing an explanation of the first digital media file. For example, the first digital media file may be an educational video describing a combustion engine. The second digital media file may be configured for superposition on the first file to illustrate important features of the video, e.g., by highlighting aspects of the combustion engine as they are explained by audio in the first digital media file. In another example, a second digital media file may be super positioned on video footage of a sports team in action. A second digital media file may be used to highlight aspects of offensive player positioning, while an alternative second digital media file may be used to highlight aspects of defensive player positioning. A user viewing the digital media module 111 may select which super positioned analysis they wish to view. In implementations including superpositioned video/image files, both first and second digital media files may be core media files 112 and/or a complementary media files 113, 114.

Segmentation and synchronization tool 204 may be a software tool in operation on computer system 110. Segmentation and synchronization tool 204 may be configured to segment and synchronize audio and visual data recorded, edited, and/or otherwise obtained via audio and visual development tools 202, 203. Segmentation and synchronization tool 204 may be employed to designate segments within audio or visual data and associate and synchronize the designated segments with segments of other audio and visual data. Segmentation and synchronization tool 204 may select digital media data as primary, secondary, or a core media file of educational digital media module 111. Segmentation and synchronization tool 204 may designate start and end points within a core media file 112 to serve as start and end points of a segment. Segmentation tool 204 may access additional digital media data for selection as complementary, or core media files and designate segments of corresponding length within the additional digital media data. Accordingly, a core media file may be associated with multiple primary and secondary digital media segments.

Rules generation tool 204 may be a software tool in operation on computer system 110. Rules generation tool 204 may be configured to generate customization rule set 117. Customization rule set 117 may store information about core media file segments 1121, 1122, 1123 and complementary media file segments 115. Stored information may include at least segment data, segment association information, segment selection criteria. Segment data may include information about the digital media data from which the segment was selected, including, for example, source file information, topic, format information, etc. Segment association information may include information about digital media segments associated with the segment for simultaneous playback. Segment selection criteria may include rules and criteria for determining which segments to provide to a user in a digital media module 111. Segmentation tool 204 may access additional digital media data for selection as primary, secondary, or core media files and designate segments of corresponding length within the additional digital media data. The user may select multiple segments for each of a primary, secondary, and/or core media file of the educational digital media module 111.

Customization rule set 117 may be accessed by customization tool 207, as described in greater detail below, to determine which associated digital media segments to present to a user. For example, a user who has selected to view a particular core media file 111 may be provided with selected complementary digital media segments 115 associated with the core media file 111 according to a comparison between the user's profile and the segment selection criteria stored in the customization rule set 117. In some implementations, the user may have first selected a complementary media file 113, 114, and may be provided with a core media file 111 and additional complementary media file according to a comparison between the user's profile and the selection criteria of the customization rule set 117. In some implementations, the user may select one, two, or three associated segments for simultaneous presentation, and the system may select the remainder of the associated segments according to the comparison.

Linking tool 206 may be configured to add supplemental components to educational digital media module 111 to link digital media content with supplementary data, as stored in supplemental content database 265 or other suitable location. Linking tool 206 may further be configured to link digital media content with other applications available on computer system 110, user device 140, or any other computer system associated with system 200. Linking tool 206 may create links between supplementary data and/or applications and portions of educational digital media module 111. Supplementary data and/or applications may be linked to specific time segments of educational digital media module 111, specific times within segments of educational digital media module 111, and/or to specific images or screen areas of educational digital media module 111. Links may be initiated from any aspect of educational digital media module 111, e.g., core media files 112 and complementary media files 113, 114. Links may be associated with the entirety of a particular segment, e.g., selecting and clicking on the secondary content during playback of a segment may launch the supplementary data. Links may be associated with portions of a particular segment, e.g., selecting and clicking on the primary content during playback at a particular time during a segment may launch supplementary data, while clicking on the primary content at a later time during the playback may launch different supplementary data. Further, links may be associated with particular aspects of a particular segment at a particular time of the segment. For example, digital media content presented visually may be bit-mapped such that different portions of the video window represent different links. The portions of the video, as well as the links represented, may change over the course of the segment. In some implementations, the bitmapped portions may be displayed in the video (e.g., with a visual icon for clicking). In some implementations, the bitmapped portions may not be delineated and a user may simply click on an element of the video to access the supplementary data. In some implementations, each link may be linked to multiple supplementary data items, which may be selected for presentation according to a user's profile. For example, linking tool 206 may create a link between a particular segment and two or more supplementary data items. When a user accesses the supplementary data items, the system may determine which supplementary data item to supply according to the user's profile, as discussed in greater detail below.

Output tool 329 may be a software tool configured to manage the display of educational digital media module 111. Output tool 329 may be configured to generate and output a display of educational digital media module 111 content for viewing by another device. Output tool 329 may receive educational digital media module display 111 file and output the informational content to a display of a user device 140.

Output tool 329 may receive educational digital media module 111 from content server. In some implementations, output tool 329 may output digital media module 111 content as a single digital media file including all of the content of the core media file 112 and complementary media files 113, 114 of digital media module 111. Software tools in operation on user device 140 may be configured to receive the educational digital media module 111, separate the components, and play them accordingly. In some implementations, output tool 329 may output educational digital media module 111 as a single interactive video stream. That is, the content of the core media file 112 and complementary media files 113, 114 may be concatenated into a single video stream suitable for play via standard media software. In some implementations, output tool 329 may be configured to output the various components of the educational digital media module 111 to the user device 140. The format of output tool 329 output may vary according to stored information about a user device 140 to which the educational digital media module 111 may be sent.

Output tool 329, operating on user device 140, may be configured to determine display characteristics of a user device and output educational digital media module 111 content accordingly. In some implementations, output tool 329 may output educational digital media module 111 to a display within a single window shared by multiple digital media file segments. The multiple digital media file segments may be displayed in a side by side format, a stacked format, a picture in picture format, and any other suitable arrangement. In some implementations, output tool 329 may output digital media segments of educational digital media module 111 to multiple repositionable display windows on user device 340. In some implementations, output tool 329 may output file segments of educational digital media module 111 to multiple display screens. In some implementations, output tool 329 may be configured to rearrange the presentation of multiple screens displaying digital media files according to an orientation or reorientation of a user device 340.

Interactivity tool 328 may be configured to facilitate user interaction with aspects of educational digital media module 111. Interactivity tool 328 may be configured to receive user input, in the form of mouse clicks, keyboard strokes, touch screen manipulations, and/or any other suitable input. Interactivity tool 328 may be configured to cause educational content server 150 to provide content according to received user inputs. For example, received user inputs may indicate a desire by the user to select a different complementary media file 113, 114. Interactivity tool 328 may receive such inputs and cause educational content server 150 to provide the appropriate content segment. Interactivity tool 328 may be configured to receive user requests for supplemental content and cause the provision of the selected supplemental content accordingly. In some implementations, interactivity tool 328 may be configured to receive user input in response to interactive digital media components, including quizzes, tests, polls, etc. In some implementations, interactivity tool 328 may be configured to record or otherwise keep track of user inputs and communicate information about user inputs to user adaptation tool 208.

In some implementations, interactivity tool 328 may be configured to bookmark educational digital media module segments according to user input. Bookmarked segments may permit a user to return to a specific point in educational digital media module 111 to replay that portion, request different complementary media files or supplementary components, explore supplemental components, and/or otherwise interact with the educational digital media module 111 at a specific point after viewing is complete. Bookmarked segments may permit a user to view the entirety of educational digital media module 111 without interruption while marking portions or segments for later reviewing.

User adaptation tool 208 may be a software tool in operation on content server 150 and may be configured to generate and cause the storage of user profiles. User profiles may be generated according to direct questions asked of a user, e.g., about preferences, according to demographic information of a user, and/or according to user interactions with an educational digital media module. User profiles may store information about a user useful for determining content to provide to a user, including user preferences, user demographics, user progress, and other suitable information. User preferences may include explicitly provided user preferences, e.g., according to questions asked about the type of content a user prefers. User preferences may include indirectly provided user preference information, e.g., as developed according to machine learning processes used to process information about a user's interaction with educational digital media module 111. For example, where a user consistently selects a particular style, type, or format of content, a user profile may include a preference for that specific content. User profiles may include user demographics, including personal information about the user, including gender, age, income, height, weight, location, education, and others. User profiles may include information indicating user progress with respect to a specific educational digital media module 111 and/or with respect to a series of associated core media files (e.g., a lecture series).

User adaptation tool 208 may be configured to generate a user profile according to user interactions with aspects of the system. User interactions may include information provided directly by a user to the system, e.g., via filling out forms and/or questionnaires. User interactions may further include information provided indirectly to the system, e.g., via user selection of content, user actions during educational digital media module 111 playback, and any other user interaction with system aspects. User adaptation tool 208 may employ machine learning techniques to build the user profile according to user actions.

User profile may store information about user preferences, user viewing habits, user learning styles, user proficiency, user progress, and any other user information. User preferences may include viewing arrangements such as viewing window sizes, audio volume, placement of on-screen controls, play speed, and other preferences. User viewing habits may include information about how a user views educational digital media modules 111, including whether a user frequently rewinds, or fast forwards, for example. User learning styles may include information about styles in which users prefer to see content presented, including whether content is presented in textual format, diagram format, audio format, etc. User learning styles may also include information about how quickly a student or user proceeds to mastery based on a presentation format, irrespective of a user's stated preferences. User proficiency may include information about a user's skill level or mastery with respect to a particular type. User progress may include information about a user's progress with respect to a single educational digital media module 111 (i.e., a furthest watched point) and/or with respect to a series of associated educational digital media modules 111 (i.e. several presentations within a given subject area).

Customization tool 207 may be a software tool in operation on content server 150 and may be configured to generate customized educational digital media modules according to user profiles. As discussed above, educational digital media module 111 may include multiple segments, with each segment having multiple choices for narrative, primary, and secondary content. According to a user profile, customization tool 207 may select appropriate core, complementary, and supplemental media files for an educational digital media module 111 to be presented to a user. In some implementations, the user may select one or more of the core or complementary media files, and customization tool 207 may select the remaining files.

Customization tool 207 may be configured to receive user interaction information via interactivity tool 328, and alter content accordingly. Customization tool 207 may be configured to receive user requests to receive specific content, e.g., a core media file 112, a complementary media file 113, 114, and/or supplementary data, and cause content server to provide the appropriate content. Customization tool 207 may be configured to provide specific content to a user according to a user's profile and according to previous requests.

Using the example of a series of educational digital media modules 111 in physics, customization tool 207 may select core media file 112 segments that cover a topic to which a student has progressed. According to the student's proficiency level, segments may be selected that cover the material at a pace and depth suited to the student. In some implementations, one or more of the core media file segments 1121, 1122, 1123 may remain the same between students, while one or more of the remaining complementary media file segments are varied to present supplemental or remedial content, according to a student's level of proficiency. In some implementations, the selected segments, either of core media file 112 or complementary media files 113, 114 may be varied according to a student's learning style. For example, a student who learns best with text may be provided with a complementary media file 113 that reflects the text of the core media file 112, while another student who learns best via diagrams may be presented with a complementary media file 113 that provides visual diagrams illustrating aspects of the core media file 112 as it is presented. In some implementations, students may receive multiple complementary media files 113, 114 for simultaneous presentation. In some implementations, supplemental content provided via supplemental component links may be selected according to any aspect of a user profile. For example, a user with low proficiency may be provided a link to additional practice material, another student may be provided with examples of real-world applications of a concept based on previously demonstrated preferences, while still another user may be provided with links containing more advanced abstract material on a concept. Accordingly, all aspects of a digital media module 111 may be customized automatically by customization tool 207 according to a student's needs and exposed preferences.

In some implementations, the system may include the ability to obtain a core media file 112 (such as an audiovisual media file including a digital video file) from a first source (such as content database 104 and/or a third party source of audio-video content such as a streaming video service), define a plurality of timestamps that divides the file into segments (where each timestamp defines the beginning or end of one segment or the end of one segment and the beginning of the next sequential segment), obtain supplemental content (such as text, graphics, or other media), distinct from any audio or captions in the core media file 112 or any complementary file 113, from a second source (such as a question database, which may be part of or separate from supplemental content database 265), apply rules that synchronize the text with segments defined by the timestamps and simultaneously display, for a plurality of users, the core media file 112 (e.g., video) from the first source and the supplemental content (e.g., text) from the second source.

In some instances, the core media file 112 file is displayed on a first display portion and the text is displayed in a second display portion (in a separate area of the screen). In some instances, the text may be displayed as an overlay on the core media file 112 file within the same display portion.

The supplemental content may include text that constitute questions relating to the subject matter of the core media file 112. Questions may be created and stored at the question database. This enables an entity associated with the second source to create tests that relate to core media file 112, which may be created elsewhere, and to associate the questions with specific segments of the core media file 112. The questions may vary in difficulty and may be designed to test for different categories of learning relating to the core media file 112.

In some instances, the questions may be provided in a separate moveable window, to be added to an existing set of windows of another application, so that the questions may be used with other (e.g., third party applications). For instance, the user device 140 may be provided with instructions to provide the questions in the separate moveable window. In some implementations, the user device 140 may access a native window manager to create the separate moveable window and associate it with another window of another application that is playing media content. Depending on the native window manager, the user device may create the separate moveable window as a child or parent of the other window (or more specifically, an application interfacing with content server 150 at user device 140 may be a parent or child application of an application of the other window). In some instances, such windows parenting may permit the questions to be overlaid onto the other window, while in other instances, the separate moveable window remains a distinct window. In this manner, the source of the media content file may be separate from the source of the questions or other supplemental content so that instructors and others may leverage third party media for classes, or for limited distribution by those who have made separate arrangements with the film maker or distributor to share or to license the use of the video.

In some instances, a user may upload a media file to use as core media file 112. The system may then create custom questions (manually or automatically as described herein) and other content for the media file. The user that uploads such media file may include an instructor or others (including students for group-learning with other students).

In operation, when a user selects the core media file 112 (e.g., via user device 140) for viewing, the system may select a subset of questions to present with the various segments of the core media file 112 based on stored rules that take into account user-specific criteria and other factors. For example, customization tool 207 may select questions, from among all questions associated with the selected core media file 112, based on the stored rules. The stored rules may be stored as customization rule set 117 and/or supplemental content database 265.

By creating, storing and displaying the questions separate from the core media file 112, there is no need to create and package the questions with the core media file 112. This technical solution enables greater flexibility for educators or others to leverage third party created content such as may be publicly available from various Internet sites.

A question may be stored with information that associates it with a particular core media file 112 or a segment of the core media file 112, along with metadata about the question, such as difficulty level, subject matter and other metadata. Correct answers for the questions may also be stored in the question database. A set of multiple choice answers may be stored with the questions and displayed with the questions.

The system may include a dynamic question generating tool (which may be part of or separate from the customization tool 207) that can create and/or select a custom set of questions for a given user and a given core media file 112. The question generating tool may associate segments of the audiovisual material with select ones of the stored questions, based on the stored rules that take into account user-specific criteria and other factors. The questions may relate to the segments the user is viewing or has viewed.

In some implementations, such creation and/or selection may be based on input from a question creator (e.g., an instructor). In this manner, an instructor or others may design questions to be provided to the user for a given segment.

In some implementations, the question generating tool may automatically create and/or select questions by using a user profile and rules to analyze a plurality of segments, and provide customized, higher-level questions and multiple choice tests, or other kinds of tests, or other activities that lead to deeper understanding and critical thinking related to the core media file 112. For example, based on the user profile, the question generating tool may identify areas of weakness of a given user's knowledge in a subject matter, and create questions for one or more segments that reinforce knowledge in the subject matter. In doing so, the question generating tool may identify one or more segments of a core media file that include the subject matter (based on, for example, metadata that describes the segment/core media file or any complementary content or other supplemental content associated with the core media file 112). The question generating tool may generate questions based on such metadata or information presented in the complementary and/or other supplemental content). In some instances, the question generating tool may automatically generate questions based on one or more audio-visual characteristics of the core media file 112. This may be performed by analyzing any color or other visual characteristics (as appropriate) and any audio characteristics (as appropriate) of the core media file 112, and then creating questions relating to such characteristics.

When the question generating tool automatically creates questions, it may automatically generate answers to such questions as well. In some instances, the question generating tool may pose the question to another user (e.g., an instructor) to provide suitable answers. Such answer, whether automatically generated or input by the instructor, will be stored in association with the question in the question database.

In some instances, a random number of question/answers sets may be selected for presentation along with a core media file 112. The number of question/answers sets may be less than the total number of watched or bookmarked segments.

The an assessment tool (which may be part of the customization tool 207 and/or other system component) may receive answers from the user and compare them to the correct answers. The assessment tool may apply rules that take into account how well the user answers the questions. The assessment tool may adapt the questions based on how well the user answers the questions. If the user does well, for example, the assessment tool may obtain harder questions from the question generating tool (which may select questions associated with "harder" levels of difficult as specified by a question designer and/or based on historic performance of the question by other users, in which a certain metric of performance such as percentage of incorrect answers will be deemed "hard" while another percentage may be deemed "easy" while still another percentage will be deemed "medium" and so on). If the user does poorly, the assessment tool may repeat questions of similar difficulty. Additionally, the assessment tool may monitor the performance of a user, and provide feedback for the user. Such feedback may include performance on the questions (whether real-time during a given session of media content file playback and/or historic performance). The feedback may include suggestions that the user replay the audiovisual media file and or suggest related material if the user does not achieve a certain level of performance in answering the questions.

Performance on the questions (whether the user is performing "well" or "poorly" or other performance descriptive) may be based on one or more thresholds of performance established by the question/test designer. The assessment tool may be measure performance based on various metrics, such as number/percentage correct, amount of time spent on questions, and/or other metric. For example, a score of 70 percent correct and above may be deemed to be performing "well" while anything below that score may be considered to be performing "poorly."

The digital media module 111 (including at least the core media file 112 and the test questions) may be transmitted to user device 140 for playback. Such transmission may occur as a download of a discrete file or streamed content. In any event, a player of user device 140 may display, via one or more displays 141/142, the core media file 112 and the questions at appropriate times.

The player may include functionality to enable a user to bookmark segments of interest using user input 144. Such bookmarks may be associated with a particular segment and/or timestamp of a core media file, as well as identifying information for the user that created the bookmarks. Additionally, the player may include functionality to enable a user to bookmark segments defined by the questions that they see. Such bookmarks may be displayed to the user (e.g., the user may view all of his or her bookmarks) and selectable to playback segments associated with the bookmarks.

The system may track the core media file 112 and specific segments that individual users have watched and store that information in a user profile, which may be stored in a database such as user profile database 275. In this manner, the system may track the user history of interaction with core media files 112 and questions taken (and/or other supplemental content).

Content server 150 (and/or other component of the system) may provide a user with access to the user's history of interaction. The user history may be recalled from the user profile of the user. For instance, the system may display the questions and answers associated with some or all of separate segments that users have watched or users have bookmarked, and the user may select to view content that was watched or bookmarked.

In some instances, the system may provide an ability to allow the user to playback (hereinafter, "view" or "watch" for convenience in the examples that follow) selected segments. This may be accomplished by providing a listing of segments associated with a given core media file 112. The listing of segments may include all segments (in which case segments already viewed by a user may be indicated), only those segments already viewed by the user, or segments not yet viewed by the user.

In some instances, the system may provide an ability to re-take corresponding questions for an already viewed segment. Such re-takes will be added to the user history to track the number of times/when a given question was taken by the user (and their corresponding results).

In some instances, the system may use profiles and rules to allow users to select a customized set of segments, text (questions), multiple choice tests, different questions and multiple choice tests related to those segments.

In some instances, the system allows users to share any or all components of the user interaction history with other users. Users with whom to share may be automatically selected based on those user who have similar viewing and bookmarking histories, performance on questions, etc. User with whom to share may be manually selected by a sharing user as well or in the alternative. The components of the user interaction history may to be shared may include, for example, segments viewed, segments bookmarked, questions, answers to the questions, performance on the questions, and/or other information from the user interaction history. Such sharing may be anonymous (i.e., data without identifying information) or associated with user identifying information.

In many of the examples described herein, the media content file 112 is described as a video media file that can be viewed/watched. However, the media content file may be an audio only file (e.g., an audiobook, an audio lecture or other audio file), which is defined by segments. Questions may be displayed on screen as the segments are played, without an additional video component (other than the questions or other content played with the audio file).

In some instances, the system may be used to present questions or other content in association with a narrative for an in-person class without a video component or with a blended learning video component.

Supplemental content database 265 may be configured to store supplemental content for the content database. Supplemental content database 265 may be a database or other memory storage structure stored on computer system 110 or any location electronically accessible by computer system 110, user device 140, and/or content server 150.

User profile database 275 may be configured to store user profiles generated by user adaptation tool 208. User profile database 275 may be a database or other memory storage structure stored on computer system 110 or any location electronically accessible by computer system 110, user device 140, and/or content server 150.

Content database 104 may be configured to store core media files 112, complementary media files 113, 114, and all associated segments, as well as customization rule set 117. Content database 104 may be a database or other memory storage structure stored on computer system 110 or any location electronically accessible by computer system 110, user device 140, and/or content server 150.

Although each is illustrated in FIGS. 1 and 2 as a single component, computer system 110, user device 140, and educational content server 150 may each include a plurality of individual components (e.g., computer devices) each programmed with at least some of the functions described herein. In this manner, some components of computer system 110, user device 140, and educational content server 150 may perform some functions while other components may perform other functions, as would be appreciated. The one or more processors 332, 342, 352 may each include one or more physical processors that are programmed by computer program instructions. The various instructions described herein are exemplary only. Other configurations and numbers of instructions may be used, so long as the processor(s) 332, 342, 352 are programmed to perform the functions described herein.

Furthermore, it should be appreciated that although the various instructions are illustrated in FIG. 1 as being co-located within a single processing unit, in implementations in which processor(s) 332, 342, 352, includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 332, 342, 352 may be programmed by one or more additional instructions that may perform some or all of the functionality attributed herein to one of the instructions.

The various instructions described herein may be stored in a storage device 314, 344, 354, which may comprise random access memory (RAM), read only memory (ROM), and/or other memory. The storage device may store the computer program instructions (e.g., the aforementioned instructions) to be executed by processor 332, 342, 352 as well as data that may be manipulated by processor 332, 342, 352. The storage device may comprise floppy disks, hard disks, optical disks, tapes, or other storage media for storing computer-executable instructions and/or data.

The various components illustrated in FIG. 2 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™, Cloud-based databases such as Amazon S3™, non-relational or no-sql databases such as MongoDB™, or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 3:
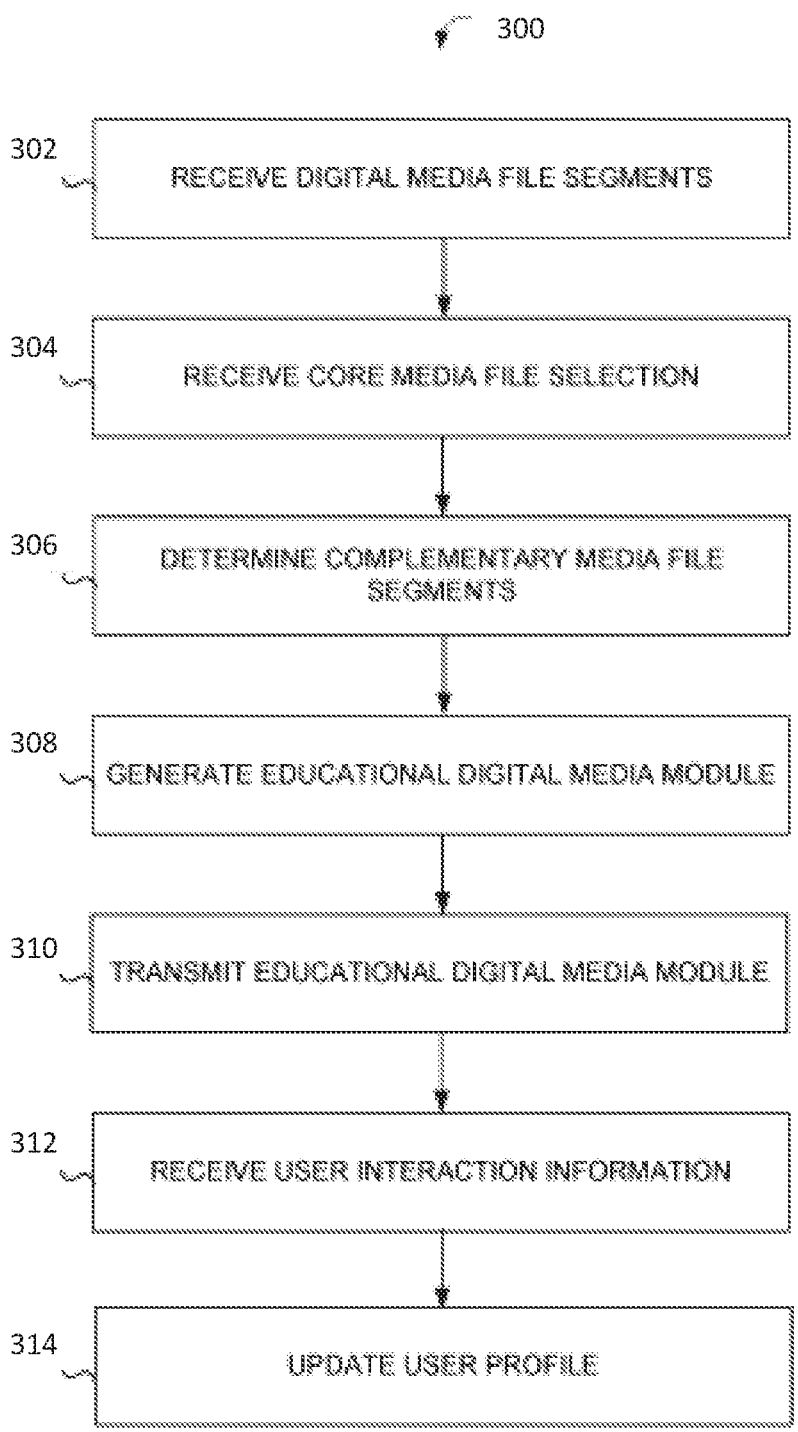
FIG. 3 depicts a process of production and display of educational digital media modules, according to an implementation of the invention.

FIG. 3 depicts a process 300 of generating and providing educational digital media module 111, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting. The following description provides an exemplary method only. Various operations and processes are described as occurring in at different locations. As discussed throughout, the described operations and processes may be performed at alternative locations and on alternative devices without departing from the scope of the description.

In an operation 302, process 300 may include obtaining core media files 112, complementary media files 113, 114, and/or digital media file segments 115 that may be used to generate an educational digital media module 111. Full media files as well as segments may be obtained. A customization rule set 117 defining associations and selection criteria of the obtained segments and files may also be obtained. The file segments may be obtained or otherwise accessed by educational content server 150.

In an operation 304, process 300 may include receiving a first core media file. The first core media file may be received from a user. A user may access educational content server 150 via user device 140 and select a core media file segment that they wish to play. The first core media file may be selected for the user based on a user profile, e.g., based on previous core media files that a user has viewed. In some implementations, several core media file segments, intended for play one after another, may be selected.

In an operation 306, process 300 may include selecting a primary complementary media file and a secondary complementary media file from the plurality of complementary media file segments according to the first core media file, the customization rule set, and the user profile. After a core media file has been selected, customization tool 207 may select appropriate primary and secondary complementary media files to accompany the core media file. Selection of the primary and secondary complementary media files may include the selection of individual segments to accompany the core media file and may include the selection of multiple segments to create longer complementary media files. In some implementations, the primary and secondary complementary media file segments may be selected from multiple alternative file segments. Selection from the multiple complementary media file segments may be based on a user profile. A user profile may define, among other information, user proficiency, user learning style, and user preferences. Selection from the multiple complementary media file segments may be based on a customization rule set 117, according to one or more of segment association data and segment selection criteria.

Customization tool 207 may further select one or more supplemental components for linking with the selected primary and secondary complementary file segments as supplemental files. Supplemental components may include links to additional information, e.g. as stored in content database 265, links to launch additional applications, links to launch websites, and any other link or connection to external information. Supplemental components may be selected according to a user profile and/or a customization rule set 117.

In an operation 308, process 300 may include generating an educational digital media module 111 including one or more of a first core media file, a primary complementary file, a secondary complementary media file, and a supplemental file component. The educational digital media module 111 may be generated by customization tool 207. The generated educational digital media module 111 may include one or more core media file segments, arranged for play one after another. Each core media file segment may be accompanied by a primary complementary media file segment, a secondary complementary media file segment, and one or more supplementary components. The selected file segments may be stored together as an educational digital media module 111. An educational digital media module 111 may include a single computer file including the content of each of the selected files and/or may include multiple associated files, each including different aspects or ones of the selected files.

In an operation 310, process 300 may include transmitting the educational digital media module 111 to a user device and causing the user device to output the educational digital media module 111. Each file of the educational digital media module, i.e., the core media file, the primary complementary file, and the secondary complementary file may be outputted simultaneously, segment by segment, while offering the user supplemental component links to the supplemental content. In some implementations, the educational digital media module 111 may be presented and displayed via the user device through a single digital media file, and thus may be output via standard media playing software. In some implementations, the educational digital media module may be output via specialized software through multiple interactive, synchronized windows or display areas.

In an operation 312, process 300 may include receiving user interaction information about a user's interaction with the concurrent digital media display. During output of an educational digital media module 111, a user may interact with the various media files, e.g., by selecting supplemental content, by slowing done or speeding up sections of the presentation, by answering quizzes and other questions presented by the presentation, and through other functions. A user's actions and interactions with the educational digital media module 111 may be stored and transmitted to a user adaptation tool 208, which may be in operation on educational content server 150. User adaptation tool 208 may store user interaction information in user profile database 275 in association with a corresponding user profile.

In an operation 314, process 300 may include adjusting a user profile according to the user interaction information. User adaptation tool 208 may use user interaction information to update a user profile stored in user profile database 275. User adaptation tool 208 may update at least one of a user proficiency, a user learning style, and user preferences according to the user interaction information. In some implementations, a user profile may be updated according to the user interaction information and information stored in the user profiles of other users. For example, a specific user behavior may be identified according to the user interaction information. In some implementations, the meaning and import of the specific user behavior may be determined according to the user profiles of other users—the user profile of the current user may be updated according to information about how other user profiles have been updated based on similar interaction information.

The systems and methods described herein provide tools that facilitate the production and distribution of customized digital media modules. Customized digital media modules, including multiple, simultaneously presented digital media files may be produced and output to users. Customized digital media modules may be customized according to user profiles and prearranged customization rules in an automated process. Customized digital media modules may be produced for providing content in multiple areas, including education, video games, entertainment, journalism, sports coaching, and others. The systems and methods described herein are intended for exemplary purposes only, and it may be recognized by those of skill in the art that alternative implementations may be achieved without departing from the scope and spirit of the technology described herein.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of supplementing an educational digital media module, the method being implemented on a computer system having one or more physical processors programmed with computer program instructions that, when executed by the one or more physical processors, cause the computer system to perform the method, the method comprising:
    obtaining, by the computer system, a plurality of core media files including at least a first core media file and a second core media file and a plurality of complementary media file segments;
    displaying, by the computer system, via a graphical user interface, a selectable listing of the plurality of core media files;
    receiving, by the computer system, a selection of the first core media file from a user via the graphical user interface;
    selecting, by the computer system, first supplemental content that has been previously linked with the first core media file, the first supplemental content comprising at least a first question to be answered by the user related to the first core media file, the first supplemental content being associated with a first segment of the first core media file and is to be displayed when the first segment of the first core media file is played;
    selecting, by the computer system, second supplemental content that has been previously linked with the first core media file, the second supplemental content comprising at least a second question to be answered by the user related to the first core media file, the second supplemental content being associated with a second segment of the first core media file and is to be displayed when the second segment of the first core media file is played;
    generating, by the computer system, an educational digital media module including the first core media file, the first supplemental content, and the second supplemental content; and
    transmitting, by the computer system, the educational digital media module to a user device having a display to cause the user device to playback the first core media file, the first supplemental content, and the second supplemental content, wherein the first core media file is displayed on a first display window of the user device and the first question is displayed on a second display window of the user device separate from the first display window,
    wherein the educational digital media module comprises a link to a streaming media service that provides the first core media file, the link causing the user device to display the first core media file from the streaming media service in the first display window and wherein the educational digital media module causes the display to provide the first question from a source other than the streaming media service.

2. The computer implemented method of claim 1, the method further comprising:
    obtaining, by the computer system, a user profile defining user characteristics of the user, wherein at least the first supplemental content is selected based on the user profile.

3. The computer implemented method of claim 2, wherein the user profile comprises a learning style or a user proficiency, the method further comprising:
    determining that the first question is suitable for the user based on the learning characteristics of the user, wherein the first supplemental content is selected based on the first question being suitable for the user.

4. The computer implemented method of claim 3, further comprising:
    receiving, by the computer system, user interaction information of a user's interaction with the concurrent digital media display;
    adjusting, by the computer system, the user profile according to the user interaction information.

5. The computer implemented method of claim 4, further comprising:
    updating, by the computer system, at least one of a user proficiency, a user learning style, and user preferences according to the user interaction information.

6. The computer implemented method of claim 2, further comprising adjusting, by the computer system, the user profile according to the user interaction information and stored user profile information of other users.

7. The computer implemented method of claim 1, further comprising:
    causing, by the computer system, the first core media file to be displayed on a first display window of the user device and the first question to be overlaid onto the first display window, wherein the educational digital media module comprises a link to a streaming media service that provides the first core media file, the link causing the user device to display the first core media file from the streaming media service in the first display window and wherein the educational digital media module causes the display to provide the first question in the first display window from a source other than the streaming media service.

8. The computer implemented method of claim 1, the method further comprising:
selecting a primary complementary media file to be displayed when the first segment is played and a second primary complementary media file segment to be displayed when the second segment is played.

9. A system for supplementing an educational digital media module, the system comprising:
a computer system having one or more physical processors programmed with computer program instructions that, when executed by the one or more physical processors, cause the computer system to:
obtain a plurality of core media files including at least a first core media file and a second core media file and a plurality of complementary media file segments;
display via a graphical user interface, a selectable listing of the plurality of core media files;
receive a selection of the first core media file from a user via the graphical user interface;
select first supplemental content that has been previously linked with the first core media file, the first supplemental content comprising at least a first question to be answered by the user related to the first core media file, the first supplemental content being associated with a first segment of the first core media file and is to be displayed when the first segment of the first core media file is played;
select second supplemental content that has been previously linked with the first core media file, the second supplemental content comprising at least a second question to be answered by the user related to the first core media file, the second supplemental content being associated with a second segment of the first core media file and is to be displayed when the second segment of the first core media file is played;
generate an educational digital media module including the first core media file, the first supplemental content, and the second supplemental content; and
transmit the educational digital media module to a user device having a display to cause the user device to playback the first core media file, the first supplemental content, and the second supplemental content, wherein the first core media file is displayed on a first display window of the user device and the first question is displayed on a second display window of the user device separate from the first display window,
wherein the educational digital media module comprises a link to a streaming media service that provides the first core media file, the link causing the user device to display the first core media file from the streaming media service in the first display window and wherein the educational digital media module causes the display to provide the first question from a source other than the streaming media service.

10. The system of claim 9, the computer system further caused to:
obtain a user profile defining user characteristics of the user, wherein at least the first supplemental content is selected based on the user profile.

11. The system of claim 10, wherein the user profile comprises a learning style or a user proficiency, the computer system further caused to:
determine that the first question is suitable for the user based on the learning characteristics of the user, wherein the first supplemental content is selected based on the first question being suitable for the user.

12. The system of claim 10, the computer system further caused to:
receive user interaction information of a user's interaction with the concurrent digital media display;
adjust the user profile according to the user interaction information.

13. The system of claim 12, the computer system further caused to:
update at least one of a user proficiency, a user learning style, and user preferences according to the user interaction information.

14. The system of claim 10, the computer system further caused to:
adjust the user profile according to the user interaction information and stored user profile information of other users.

15. The system of claim 9, the computer system further caused to:
cause the first core media file to be displayed on a first display window of the user device and the first question to be overlaid onto the first display window, wherein the educational digital media module comprises a link to a streaming media service that provides the first core media file, the link causing the user device to display the first core media file from the streaming media service in the first display window and wherein the educational digital media module causes the display to provide the first question in the first display window from a source other than the streaming media service.

16. The system of claim 9, the computer system further caused to:
select a primary complementary media file to be displayed when the first segment is played and a second primary complementary media file segment to be displayed when the second segment is played.

* * * * *